(12) United States Patent
Koo et al.

(10) Patent No.: US 7,218,949 B2
(45) Date of Patent: May 15, 2007

(54) OUTER LOOP POWER CONTROL FOR WIRELESS COMMUNICATION SYSTEMS

(75) Inventors: Chang-Soo Koo, Northport, NY (US); Sudheer A. Grandhi, White Plains, NY (US); Stephen E. Terry, Northport, NY (US)

(73) Assignee: InterDigital Technology Corporation, Wilmington, DE (US)

( * ) Notice: Subject to any disclaimer, the term of this patent is extended or adjusted under 35 U.S.C. 154(b) by 716 days.

(21) Appl. No.: 10/721,392

(22) Filed: Nov. 25, 2003

(65) Prior Publication Data

US 2004/0106425 A1    Jun. 3, 2004

Related U.S. Application Data

(60) Provisional application No. 60/444,850, filed on Feb. 4, 2003, provisional application No. 60/429,888, filed on Nov. 26, 2002.

(51) Int. Cl.
*H04Q 7/20* (2006.01)
*H04B 7/00* (2006.01)
*H04B 1/04* (2006.01)

(52) U.S. Cl. ............... 455/522; 455/69; 455/127.1; 370/329

(58) Field of Classification Search ........... 455/522, 455/69, 127.1, 67.11; 370/392, 252, 276, 370/280
See application file for complete search history.

(56) References Cited

U.S. PATENT DOCUMENTS

| | | | |
|---|---|---|---|
| 5,995,496 A | 11/1999 | Honkasalo et al. | |
| 6,173,162 B1 | 1/2001 | Dahlman et al. | |
| 6,285,886 B1 | 9/2001 | Kamel et al. | |
| 6,285,887 B1 | 9/2001 | Mimura | |
| 6,337,989 B1 | 1/2002 | Agin | |
| 6,622,024 B2* | 9/2003 | Koo et al. | 455/522 |
| 7,133,689 B2* | 11/2006 | Koo et al. | 455/522 |
| 2003/0036403 A1* | 2/2003 | Shiu et al. | 455/522 |
| 2003/0054849 A1* | 3/2003 | Koo et al. | 455/522 |
| 2004/0198294 A1* | 10/2004 | Hagin-Metzer | 455/296 |

FOREIGN PATENT DOCUMENTS

| | | |
|---|---|---|
| CN | 1375956 | 10/2002 |
| CN | 1407816 | 4/2003 |
| CN | 1453951 | 11/2003 |
| EP | 1235454 | 8/2002 |
| JP | 244879 | 9/2001 |

\* cited by examiner

*Primary Examiner*—Tilahun Gesesse
(74) *Attorney, Agent, or Firm*—Volpe and Koenig, P.C.

(57) ABSTRACT

A method system and components for outer loop power control particularly useful for non-real time/real time data services uses data transmitted in many bursts of short duration, called Temp-DCH allocations. A target metric, preferably, target SIR, is adjusted with differing step up and step down levels to converge on a relatively low steady state level of step up and step down target metric adjustments. The initial target SIR and the transient step size for target SIR adjustment is determined in a dynamic way in the outer loop power control for each Temp-DCH allocation of non-real time data.

49 Claims, 9 Drawing Sheets

OUTER LOOP POWER CONTROL FOR WIRELESS COMMUNICATION SYSTEMS

CROSS REFERENCE TO RELATED APPLICATION(S)

This application claims priority from U.S. provisional application No. 60/429,888, filed Nov. 26, 2002 and U.S. provisional application No. 60/444,850, filed Feb. 4, 2003, which are incorporated by reference as if fully set forth.

FIELD OF INVENTION

The invention generally relates to wireless communication systems. In particular, the invention relates to power control in such systems.

BACKGROUND

Wireless telecommunication systems are well known in the art. In order to provide global connectivity for wireless systems, standards have been developed and are being implemented. One current standard in widespread use is known as Global System for Mobile Telecommunications (GSM). This is considered as a so-called Second Generation mobile radio system standard (2G) and was followed by its revision (2.5G). GPRS and EDGE are examples of 2.5G technologies that offer relatively high speed data service on top of (2G) GSM networks. Each one of these standards sought to improve upon the prior standard with additional features and enhancements. In January 1998, the European Telecommunications Standard Institute—Special Mobile Group (ETSI SMG) agreed on a radio access scheme for Third Generation Radio Systems called Universal Mobile Telecommunications Systems (UMTS). To further implement the UMTS standard, the Third Generation Partnership Project (3GPP) was formed in December 1998. 3GPP continues to work on a common third generational mobile radio standard.

A typical UMTS system architecture in accordance with current 3GPP specifications is depicted in FIG. 1. The UMTS network architecture includes a Core Network (CN) interconnected with a UMTS Terrestrial Radio Access Network (UTRAN) via an interface known as Iu which is defined in detail in the current publicly available 3GPP specification documents. The UTRAN is configured to provide wireless telecommunication services to users through wireless transmit receive units (WTRUs), known as User Equipments (UEs) in 3GPP, via a radio interface known as Uu. The UTRAN has one or more Radio Network Controllers (RNCs) and base stations, known as Node Bs in 3GPP, which collectively provide for the geographic coverage for wireless communications with UEs. One or more Node Bs are connected to each RNC via an interface known as Iub in 3GPP. The UTRAN may have several groups of Node Bs connected to different RNCs; two are shown in the example depicted in FIG. 1. Where more than one RNC is provided in a UTRAN, inter-RNC communication is performed via an Iur interface.

Communications external to the network components are performed by the Node Bs on a user level via the Uu interface and the CN on a network level via various CN connections to external systems.

In general, the primary function of base stations, such as Node Bs, is to provide a radio connection between the base stations' network and the WTRUs. Typically a base station emits common channel signals allowing non-connected WTRUs to become synchronized with the base station's timing. In 3GPP, a Node B performs the physical radio connection with the UEs. The Node B receives signals over the Iub interface from the RNC that control the radio signals transmitted by the Node B over the Uu interface.

A CN is responsible for routing information to its correct destination. For example, the CN may route voice traffic from a UE that is received by the UMTS via one of the Node Bs to a public switched telephone network (PSTN) or packet data destined for the Internet. In 3GPP, the CN has six major components: 1) a serving General Packet Radio Service (GPRS) support node; 2) a gateway GPRS support node; 3) a border gateway; 4) a visitor location register; 5) a mobile services switching center; and 6) a gateway mobile services switching center. The serving GPRS support node provides access to packet switched domains, such as the Internet. The gateway GPRS support node is a gateway node for connections to other networks. All data traffic going to other operator's networks or the internet goes through the gateway GPRS support node. The border gateway acts as a firewall to prevent attacks by intruders outside the network on subscribers within the network realm. The visitor location register is a current serving networks 'copy' of subscriber data needed to provide services. This information initially comes from a database which administers mobile subscribers. The mobile services switching center is in charge of 'circuit switched' connections from UMTS terminals to the network. The gateway mobile services switching center implements routing functions required based on current location of subscribers. The gateway mobile services switching center also receives and administers connection requests from subscribers from external networks.

The RNCs generally control internal functions of the UTRAN. The RNCs also provides intermediary services for communications having a local component via a Uu interface connection with a Node B and an external service component via a connection between the CN and an external system, for example overseas calls made from a cell phone in a domestic UMTS.

Typically a RNC oversees multiple base stations, manages radio resources within the geographic area of wireless radio service coverage serviced by the Node Bs and controls the physical radio resources for the Uu interface. In 3GPP, the Iu interface of an RNC provides two connections to the CN: one to a packet switched domain and the other to a circuit switched domain. Other important functions of the RNCs include confidentiality and integrity protection.

In many wireless communication systems, adaptive transmission power control algorithms are used. In such systems, many communications may share the same radio frequency spectrum. When receiving a specific communication, all the other communications using the same spectrum cause interference to the specific communication. As a result, increasing the transmission power level of one communication degrades the signal quality of all other communications within that spectrum. However, reducing the transmission power level too far results in undesirable received signal quality, such as measured by signal to interference ratios (SIRs) at the receivers.

Various methods of power control for wireless communication systems are well known in the art. Examples of open and closed loop power control transmitter systems for wireless communication systems are illustrated in FIGS. 2 and 3, respectively. The purpose of such systems is to rapidly vary transmitter power in the presence of a fading propagation channel and time-varying interference to minimize transmitter power while insuring that data is received at the remote end with acceptable quality.

In communication systems such as Third Generation Partnership Project (3GPP) Time Division Duplex (TDD) and Frequency Division Duplex (FDD) systems, multiple shared and dedicated channels of variable rate data are combined for transmission. Background specification data for such systems are found at 3GPP TS 25.223 v3.3.0, 3GPP TS 25.222 v3.2.0, 3GPP TS 25.224 v3.6 and Volume 3 specifications of Air-Interface for 3G Multiple System Version 1.0, Revision 1.0 by the Association of Radio Industries Businesses (ARIB). A fast method and system of power control adaptation for data rate changes resulting in more optimal performance is taught in International Publication Number WO 02/09311 A2, published 31 Jan. 2002 and corresponding U.S. patent application Ser. No. 09/904,001, filed Jul. 12, 2001 owned by the assignee of the present invention.

In 3GPP W-CDMA systems, power control is used as a link adaptation method. Dynamic power control is applied for dedicated physical channels (DPCH), such that the transmit power of the DPCHs is adjusted to achieve a quality of service (QoS) with a minimum transmit power level, thus limiting the interference level within the system.

One approach is to divide transmission power control into separate processes, referred to as outer loop power control (OLPC) and inner loop power control (ILPC). The power control system is generally referred to as either open or closed dependent upon whether the inner loop is open or closed. The outer loops of both types of systems as illustrated in the examples depicted in FIGS. 2 and 3 are closed loops. The inner loop in the open loop type of system illustrated in FIG. 2 is an open loop.

In outer loop power control, the power level of a specific transmitter is based on a target SIR value. As a receiver receives the transmissions, the quality of the received signal is measured. The transmitted information is sent in units of transport blocks (TBs), and the received signal quality can be monitored on a block error rate (BLER) basis. The BLER is estimated by the receiver, typically by a cyclic redundancy check (CRC) of the data. This estimated BLER is compared to a target quality requirement, such a target BLER, representative of QoS requirements for the various types of data services on the channel. Based on the measured received signal quality, a target SIR adjustment control signal is sent to the transmitter. The transmitter adjusts the target SIR in response to these adjustment requests.

In third generation partnership program (3GPP) wideband code division multiple access (W-CDMA) systems utilizing time division duplex (TDD) mode, the UTRAN (SRNC-RRC) sets the initial target SIR to the WTRU at the call/session establishment and then subsequently continuously adjusts the target SIR of the WTRU during the life term of the call as dictated by the observation of the uplink (UL) BLER measurement.

In inner loop power control, the receiver compares a measurement of the received signal quality, such as SIR, to a threshold value (i.e., the target SIR). If the SIR exceeds the threshold, a transmit power command (TPC) to decrease the power level is sent. If the SIR is below the threshold, a TPC to increase the power level is sent. Typically, the TPC is multiplexed with data in a dedicated channel to the transmitter. In response to received TPC, the transmitter changes its transmission power level.

Conventionally, the outer loop power control algorithm in a 3GPP system sets an initial target SIR for each coded composite transport channel (CCTrCH) based on the required target BLER, using a fixed mapping between BLER and SIR, assuming a particular channel condition. A CCTrCH is commonly employed for transmitting various services on a physical wireless channel by multiplexing several transport channels (TrCHs), each service on its own TrCH. In order to monitor the BLER level on a CCTrCH basis, a reference transport channel (RTrCH) may be selected among the transport channels multiplexed on the considered CCTrCH. For example, a TrCH-1 may be selected for RTrCH as it may be regarded as a mid-point of all channel conditions on the CCTrCH, including an AWGN channel. A mismatch between a target BLER and a target SIR may vary significantly depending on the given channel condition, especially at very low BLER. For instance, the target SIR at a target BLER=0.01 for TrCH-1 in the Case 1 channel condition may require more than 4 dB over the target SIR for another transport channel in the AWGN channel condition, (i.e., TrCH-1 requires a stronger signal). When the WTRU converts the target BLER to an initial target SIR, there may be an error caused by this channel condition mismatch, since the target SIR required for a target BLER varies with channel conditions. As a result, the iterative process for target SIR determination has an initial differential that must be overcome by convergence to the required target, compounded by allowing the CRC process to occur, which altogether creates an undesirable delay for target SIR convergence.

The entire power control algorithm may suffer degraded performance as a result of the delay. The delay is denoted in terms of the transmission rate unit, a transmission time interval (TTI). The smallest interval is one frame of data, typically defined as 10 ms for a 3GPP communication system. In a 3GPP system, TTIs are in lengths of 10, 20, 40, or 80 ms.

Also, a wireless channel can transmit a variety of services, such as video, voice, and data, each having different QoS requirements. For non-real time (NRT) data services, data is transmitted in many bursts of short duration. In a 3GPP system for example, these data bursts are mapped as transport blocks on a temporary dedicated channel (Temp-DCH). This mapping is also referred to in terms of Temp-DCH allocations. One or more transport blocks are mapped onto the channel per TTI. Thus, each service is mapped across several TTIs, while target SIR adjustments are made on a TTI basis during OLPC for the Temp-DCH allocations.

When comparing voice and data types of transmissions, a real time (RT) voice transmission is more likely have a target BLER that is more tolerant (i.e., higher BLER value), while a NRT data transmission requires a lower rate of error with a lower target BLER. Accordingly, the expected delays to ensure QoS are longer for a data download than for a voice transmission. Further, the required transient step size for target SIR adjustments is set depending on the service's QoS requirement. While the initial target SIR for RT data will always converge to the desired target SIR, the initial target SIR for NRT data, which is newly assigned per Temp-DCH allocation, may not converge to the desired target SIR due to short duration of Temp-DCH allocation.

This invention recognizes that Temp-DCH allocation duration can be used as an additional parameter to enhance power control.

SUMMARY

A method of transmission power control is provided for a wireless transmit receive unit (WTRU) that transmits data signals in a forward channel in selectively sized block allocations where the WTRU is configured to make forward channel power adjustments as a function of target metrics computed based on the data signals as received over the forward channel, the method comprising the following steps. A series of data signal block allocations, each of a predetermined size S, is received spaced apart in time from the WTRU on the forward channel. For the data signals of each block allocation, target metrics for the WTRU's forward channel power adjustments are computed based on the detection of predetermined error conditions in the signals received on the forward channel, including setting an initial target metric value and storing a last target metric computed for each block allocation of data. For the data signals of each block allocation after a first block allocation, the initial target metric value are set as a function of the last target metric computed for an immediately preceding block allocation and an inter-allocation adjustment based on the time spacing from the immediately preceding block allocation. After a preliminary period at the initial value, the target metric is changed by a step up or a step down amount at time intervals of a predetermined length whereby the target metric is increased by the step up amount if a predetermined error condition has been detected in an immediately preceding time interval or is decreased by the step down amount if the predetermined error condition has not been detected the immediately preceding time interval. Setting the step down amount at an initial transient state level is based on the predetermined block allocation size S, such that the initial step down amount is set at a level at least as great as a predetermined step down amount for a steady state steady state level. Where the initial step down amount is greater than the predetermined step down amount for the steady state steady state level, the step down amount is reduced by a selected amount to a lower level if a predetermined error condition has been detected in an immediately preceding time interval until the step down amount is reduced to the predetermined step down amount for the steady state steady state level.

A receiving wireless transmit receive unit (WTRU) is provided for implementing transmission power control for a transmitting WTRU that transmits data signals in a forward channel in selectively sized block allocations of predetermined size S where the transmitting WTRU is configured to make forward channel transmission power adjustments as a function of target metrics computed by the receiving WTRU. The receiving WTRU comprises the following. A receiver receives a series of block allocations of data signals spaced apart in time from the WTRU on the forward channel. A processor is configured for computing target metrics for implementing forward channel transmission power adjustments in the transmitting WTRU based on the detection of predetermined error conditions in the data signals received on the forward channel. The processor is also configured to compute target metrics such that for the data signals of each block allocation, an initial target metric value is set and a last target metric computed for each block allocation of data is stored. The processor is further configured such that for the data signals of each block allocation after a first block allocation, the initial target metric value is set as a function of the stored last target metric computed for an immediately preceding block allocation and an inter-allocation adjustment for time spacing from the immediately preceding block allocation. After a preliminary period at an initial value, the target metric is changed by a step up or a step down amount at time intervals of a predetermined length whereby the target metric is increased by the step up amount if a predetermined error condition has been detected in an immediately preceding time interval or the target metric is decreased by the step down amount if the predetermined error condition has not been detected in the immediately preceding time interval. The step down amount is set at an initial transient state level based on the predetermined block allocation size S, such that the initial step down amount is set at a level at least as great as a predetermined step down amount for a steady state steady state level; and where the initial step down amount is greater than the predetermined step down amount for the steady state steady state level, the step down amount is reduced by a selected amount to a lower level if a predetermined error condition has been detected in an immediately preceding time interval until the step down amount is reduced to the predetermined step down amount for the steady state steady state level.

BRIEF DESCRIPTION OF THE DRAWING(S)

DETAILED DESCRIPTION OF THE PREFERRED EMBODIMENT(S)

Figure 1:
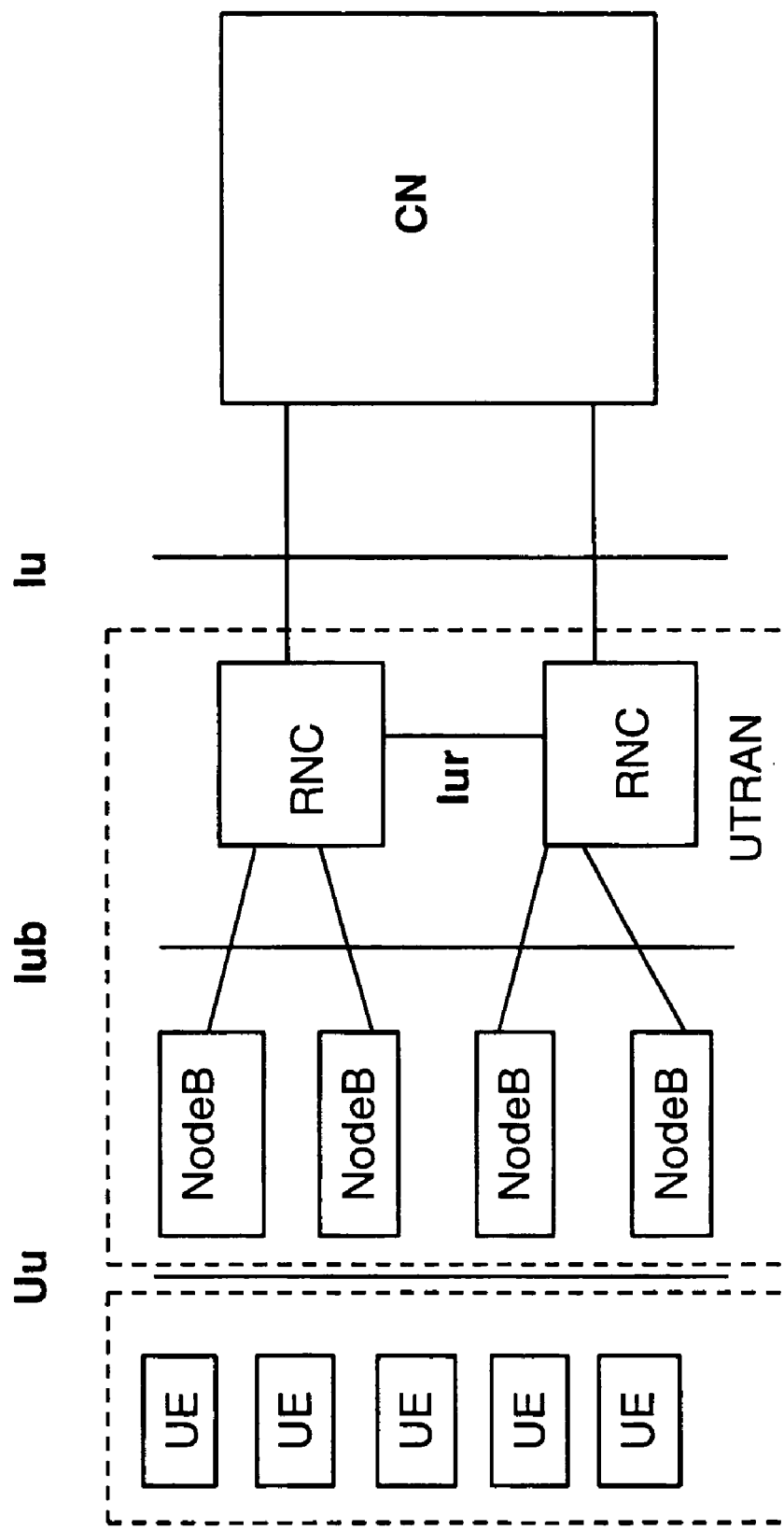
FIG. 1 shows an overview of a system architecture of a conventional UMTS network.

The present invention is described with reference to the drawing figures wherein like numerals represent like elements throughout. The terms base station, wireless transmit/receive unit (WTRU) and mobile unit are used in their general sense. The term base station as used herein includes, but is not limited to, a base station, Node-B, site controller, access point, or other interfacing device in a wireless environment that provides WTRUs with wireless access to a network with which the base station is associated.

The term WTRU as used herein includes, but is not limited to, user equipment (UE), mobile station, fixed or mobile subscriber unit, pager, or any other type of device capable of operating in a wireless environment. WTRUs include personal communication devices, such as phones, video phones, and Internet ready phones that have network connections. In addition, WTRUs include portable personal computing devices, such as PDAs and notebook computers with wireless modems that have similar network capabilities. WTRUs that are portable or can otherwise change location are referred to as mobile units.

Although the embodiments are described in conjunction with a third generation partnership program (3GPP) wideband code division multiple access (W-CDMA) system utilizing the time division duplex mode, the embodiments are applicable to any hybrid code division multiple access (CDMA)/time division multiple access (TDMA) communication system. Additionally, the embodiments are applicable to CDMA systems, in general, such as the proposed frequency division duplex (FDD) mode of 3GPP W-CDMA.

Conventional power control methods for wireless systems such as 3GPP utilize so-called inner and outer loops. The power control system is referred to as either open or closed dependent upon whether the inner loop is open or closed. The outer loops of both types of systems are closed loops.

Figure 2:
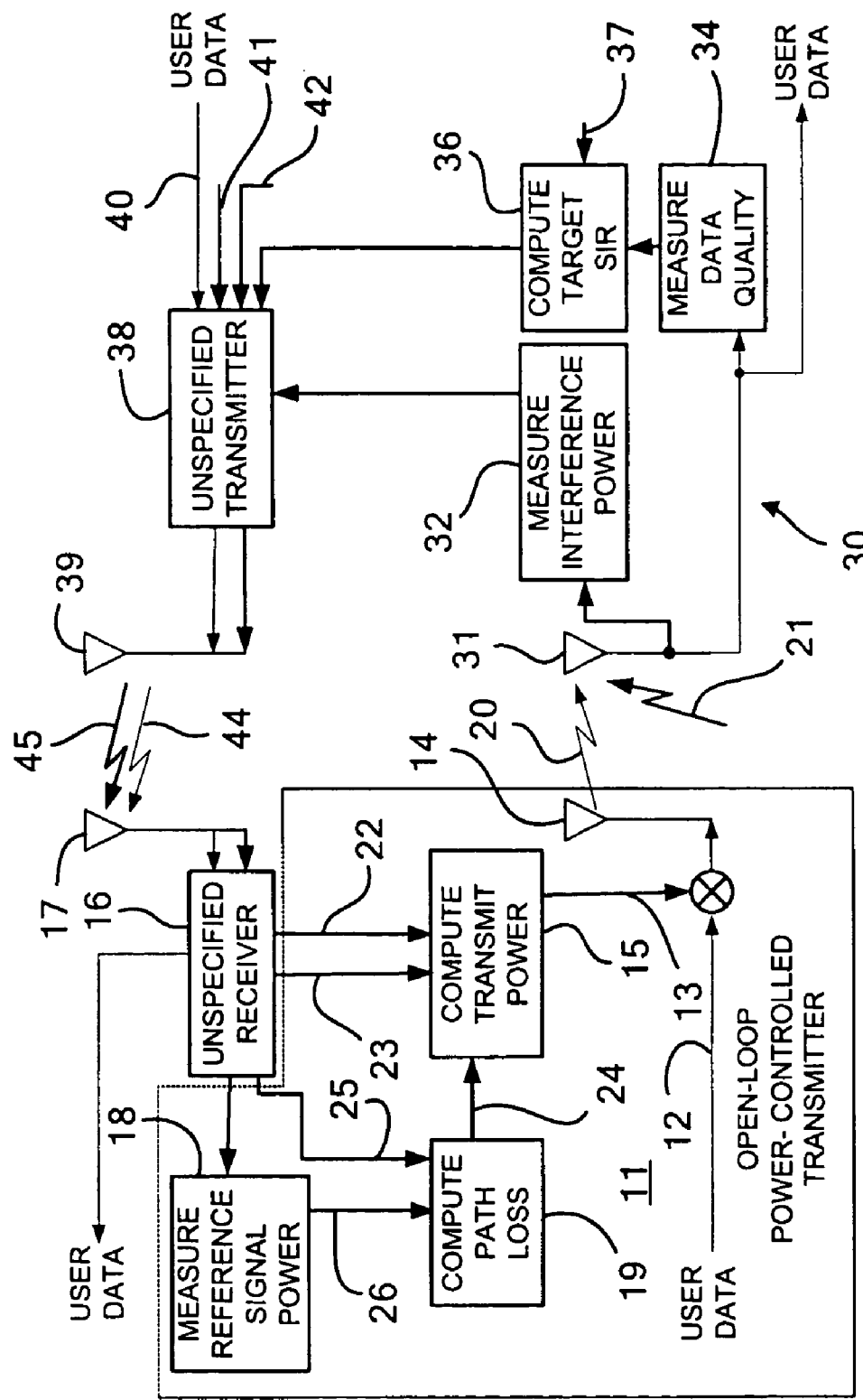
FIG. 2 is a schematic diagram of a conventional open loop power control system for a wireless communication system which implements outer loop power control via a target SIR metric.

Pertinent portions of an open loop power control system having a "transmitting" communication station 10 and a "receiving" communication station 30 are shown in FIG. 2. Both stations 10, 30 are transceivers. Typically one is a base station, called a Node B in 3GPP, and the other a type of WTRU, called a user equipment UE in 3GPP. For clarity, only selected components are illustrated and the invention is described in terms of a preferred 3GPP system, but the invention has application to wireless communication systems in general, even such systems that perform ad hoc networking where WTRUs communicate between themselves. Power control is important to maintain quality signaling for multiple users without causing excessive interference.

The transmitting station 10 includes a transmitter 11 having a data line 12 which transports a user data signal for transmission. The user data signal is provided with a desired power level which is adjusted by applying a transmit power adjustment from an output 13 of a processor 15 to adjust the transmission power level. The user data is transmitted from an antenna system 14 of the transmitter 11.

A wireless radio signal 20 containing the transmitted data is received by the receiving station 30 via a receiving antenna system 31. The receiving antenna system will also receive interfering radio signals 21 which impact on the quality of the received data. The receiving station 30 includes an interference power measuring device 32 to which the received signal is input which device 32 outputs measured interference power data. The receiving station 30 also includes a data quality measuring device 34 into which the received signal is also input which device 34 produces a data quality signal. The data quality measuring device 34 is coupled with a processing device 36 which receives the signal quality data and computes target signal to interference ratio (SIR) data based upon a user defined quality standard parameter received through an input 37.

The receiving station 30 also includes a transmitter 38 which is coupled with the interference power measuring device 32 and the target SIR generating processor 36. The receiving station's transmitter 38 also includes inputs 40, 41, 42 for user data, a reference signal, and reference signal transmit power data, respectively. The receiving station 30 transmits its user data and the control related data and references signal via an associated antenna system 39.

The transmitting station 10 includes a receiver 16 and an associated receiving antenna system 17. The transmitting station's receiver 16 receives the radio signal transmitted from the receiving station 30 which includes the receiving station's user data 44 and the control signal and data 45 generated by the receiving station 30.

The transmitting station's transmitter's processor 15 is associated with the transmitting station's receiver 16 in order to compute a transmit power adjustment. The transmitter 11 also includes a device 18 for measuring received reference signal power which device 18 is associated with path loss computing circuitry 19.

In order to compute the transmit power adjustment, the processor 15 receives data from a target SIR data input 22 which carries the target SIR data generated by the receiver station's target SIR generating processor 36, an interference power data input 23 which carries the interference data generated by the receiving station's interference power measuring device 32, and a path loss data input 24 which carries a path loss signal that is the output of the path loss computing circuitry 19. The path loss signal is generated by the path loss computing circuitry 19 from data received via a reference signal transmit power data input 25 which carries the reference signal transmit power data originating from the receiving station 30 and a measured reference signal power input 26 which carries the output of the reference signal power measuring device 18 of the transmitter 11. The reference signal measuring device 18 is coupled with the transmitting station's receiver 16 to measure the power of the reference signal as received from the receiving station's transmitter 38. The path loss computing circuitry 19 preferably determines the path loss based upon the difference between the known reference power signal strength conveyed by input 25 and the measured received power strength conveyed by input 26.

Interference power data, reference signal power data and target SIR values are signaled to the transmitting station 10 at a rate significantly lower than the time-varying rate of the propagation channel and interference. The "inner" loop is the portion of the system which relies on the measured interface. The system is considered "open loop" because there is no feedback to the algorithm at a rate comparable to the time-varying rate of the propagation channel and interference indicating how good the estimates of minimum required transmitter power are. If required transmit power level changes rapidly, the system cannot respond accordingly to change the power adjustment in a timely manner.

With respect to the outer loop of the open loop power control system of FIG. 2, at the remote receiver station 30, the quality of the received data is evaluated via the measuring device 34. Typical metrics for digital data quality are bit error rate and block error rate. Computation of these metrics requires data accumulated over periods of time significantly longer than the period of the time-varying propagation channel and interference. For any given metric, there exists a theoretical relationship between the metric and received SIR. When enough data has been accumulated in the remote receiver to evaluate the metric, it is computed and compared with the desired metric (representing a desired quality of service) in processor 36 and an updated target SIR is then output. The updated target SIR is that value (in theory) which applied in the transmitter inner loop would cause the measured metric to converge to the desired value. Finally, the updated target SIR is passed, via the receiving station transmitter 38 and the transmitting station receiver 16, to the transmitter 11 for use in its inner loop. The update rate of target SIR is bounded by the time required to accumulate the quality statistic and practical limits on the signaling rate to the power-controlled transmitter.

Figure 3:
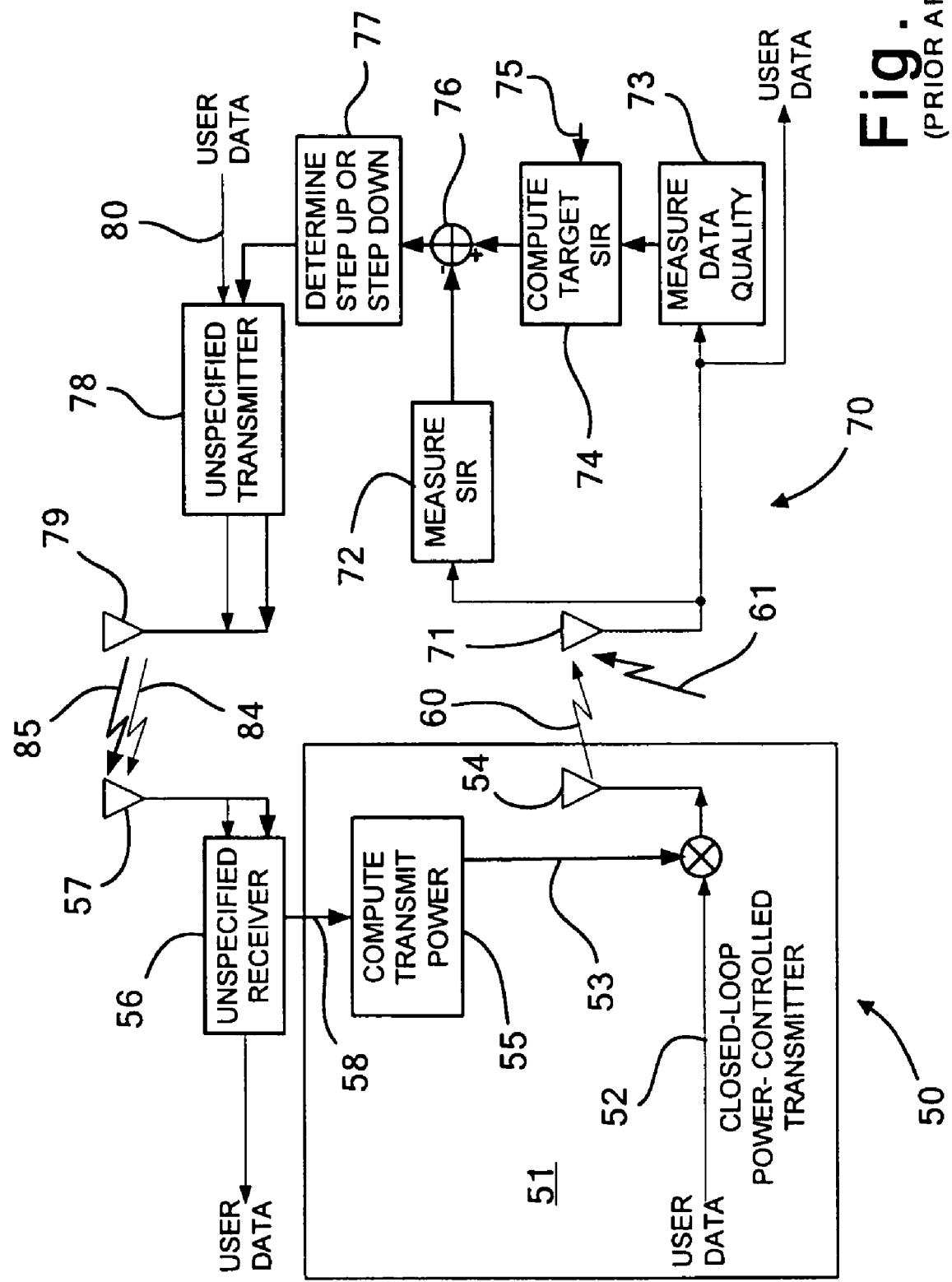
FIG. 3 is a schematic diagram of a conventional closed loop power control system for a wireless communication system which implements outer loop power control via a target SIR metric.

With reference to FIG. 3, a communication system having a transmitting station 50 and a receiving station 70 which employs a closed loop power control system is illustrated.

The transmitting station 50 includes a transmitter 51 having a data line 52 which transports a user data signal for transmission. The user data signal is provided with a desired power level which is adjusted by applying a transmit power adjustment from an output 53 of a processor 55 to adjust the power level. The user data is transmitted via an antenna system 54 of the transmitter 51.

A wireless radio signal 60 containing the transmitted data is received by the receiving station 70 via a receiving antenna system 71. The receiving antenna system will also receive interfering radio signals 61 which impact on the quality of the received data. The receiving station 70 includes an interference power measuring device 72 to which the received signal is input which device 72 outputs measured SIR data. The receiving station 70 also includes a data quality measuring device 73 into which the received signal is also input which device 73 produces a data quality signal. The data quality measuring device 73 is coupled with a processor 74 which receives the signal quality data and computes target signal to interference ratio (SIR) data based upon a user defined quality standard parameter received through an input 75.

A combiner 76, preferably a substracter, compares the measured SIR data from the device 72 with the computed target SIR data from the processor 74, preferably by subtracting, to output an SIR error signal. The SIR error signal from the combiner 76 is input to processing circuitry 77 which generates step up/down commands based thereon.

The receiving station 70 also includes a transmitter 78 which is coupled with the processing circuitry 77. The receiving station's transmitter 78 also includes an input 80 for user data. The receiving station 70 transmits its user data and the control related data via an associate antenna system 79.

The transmitting station 50 includes a receiver 56 and an associated receiving antenna system 57. The transmitting station's receiver 56 receives the radio signal transmitted from the receiving station 70 which includes the receiving station's user data 84 and the control data 85 generated by the receiving station.

The transmitting station's transmitter's processor 55 has an input 58 associated with the transmitting station's receiver 16. The processor 55 receives the up/down command signal through input 58 and computes the transmit power adjustments based thereon.

With respect to the inner loop of the closed loop power control system, the transmitting station's transmitter 51 sets its power based upon high-rate step up and step down commands generated by the remote receiving station 70. At the remote receiving station 70, the SIR of the received data is measured by the measuring device 72 and compared with a target SIR value generated by the processor 74 via combiner 76. The target SIR is that value (in theory) which, given that the data is received with that value, results in a desired quality of service. If the measured received SIR is less than the target SIR, a step down command is issued by the processing circuitry 77, via the receiving station's transmitter 78 and the transmitting station's receiver 56, to the transmitter 51, otherwise a step up command is issued. The power control system is considered closed-loop because of the high-rate feedback of the step up and step down commands which can react in real time to the time-varying propagation channel and interference. If required transmit power level changes due to time varying interference and propagation, it quickly responds and adjusts transmit power accordingly.

With respect to the outer loop of the closed loop power control system, the quality of the received data is evaluated in the receiving station 70 by the measuring device 73. Typical metrics for digital data quality are bit error rate and block error rate. Computation of these metrics requires data accumulated over periods of time significantly longer than the period of the time-varying propagation channel and interference. For any given metric, there exists a theoretical relationship between the metric and received SIR. When enough data has been accumulated in the remote receiver to evaluate the metric, it is computed and compared with the desired metric (representing a desired quality of service) by the processor 74 and an updated target SIR is then output. The updated target SIR is that value (in theory) which applied in the receiver algorithm would cause the measured metric to converge to the desired value. The updated target SIR is then used in the inner loop to determine the direction of the step up/down commands sent to the transmitting station's power scale generating processor 55 to control the power of the transmitter 51.

For outer loop power control, irrespective of its implementation in either an open loop system as illustrated in FIG. 2 or a closed loop system as illustrated in FIG. 3, an initial target metric, such as target SIR, is set that is then recomputed based on the outer loop feedback occurring during a wireless communication. Conventionally, the adjustment the target metric is performed using a fixed step method where set increments of step up and step down are employed to converge on a desired target.

This conventional approach is modified by the present invention to determine the initial target SIR for NRT data. For example, a WTRU of a 3GPP system at the beginning of a radio link setup or at a handover uses the following conditional steps:

(1) If the duration (or TTI size S) of a first Temp-DCH allocation is shorter than a threshold (e.g., a predetermined convergence time target), then an initial target SIR is obtained from an initial mapping look-up table and offset by a value (e.g., $2*\log_{10}(1/BLER)$). The offset value is determined based on the variance of fading channel conditions. For example, if fading channel conditions are highly erratic, then an offset value will be adjusted upward. The downlink outer loop power control does not make any adjustments to the initial target SIR (i.e., the target SIR for Temp-DCH is fixed at the initial target SIR). The downlink inner loop power control (ILPC) will run normally to compensate for fast fading and systematic/measurement bias errors. Generally, ILPC does not involve target SIR adjustments.

(2) If the duration of a first Temp-DCH allocation is longer than a threshold (e.g., the predetermined convergence time target), then an initial target SIR is obtained from an initial mapping look-up table and the downlink power control operates normally.

(3) If the changes in target SIR (actual measured target SIR—initial target SIR from a RNC) for previous services are available, an initial target SIR for a new service is adjusted with the average of changes in target SIR instead of above steps (1) and (2). This takes advantage of the increased accuracy achieved by the outer loop power control for previous services.

Figure 4:
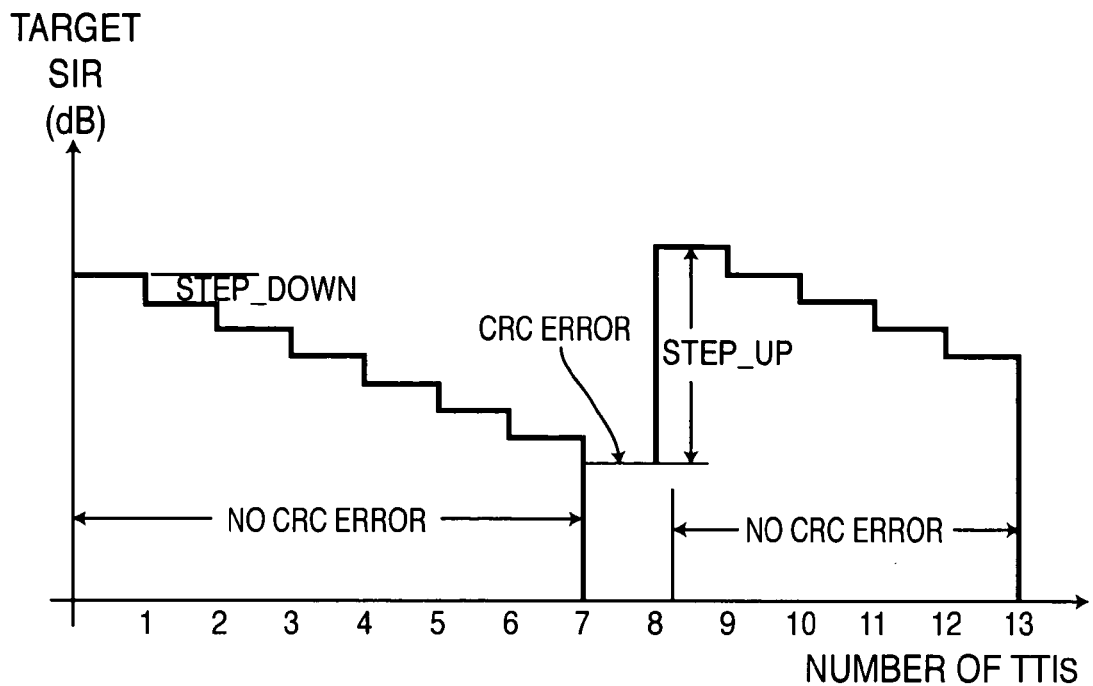
FIG. 4 illustrates a plot of target SIR adjustments according with a jump algorithm as applicable to downlink OLPC.

After the initial target SIR is set, the down link outer loop power control process utilizes a "jump" algorithm that adjusts a target SIR based on the result of CRC of the data. FIG. 4 illustrates the use of a generic jump algorithm graphically. Each step up and step down in target SIR is a relatively fixed step size adjustment, once at the beginning of each TTI. A CRC is preferably performed at each TTI, and step down adjustments are made for every CRC having no error, while upon a CRC error detection, a step up adjustment is made.

In a preferred embodiment of the present invention, the basic jump algorithm is represented by the following. If the CRC check of the $k^{th}$ block does not detect an error, then $$\text{target\_SIR}(k) = \text{target\_SIR}(k-1) - SD(dB), \quad \text{Equation 1}$$

else, if a CRC error occurs, then $$\text{target\_SIR}(k) = \text{target\_SIR}(k-1) + SU\ (dB) \quad \text{Equation 2}$$

where step down SD and step up SU are calculated by the following equations:

$$SD = SS \cdot \text{target\_BLER} \quad \text{Equation 3}$$

$$SU = SS - SD \quad \text{Equation 4}$$

where SS is the step size for the adjustment to target SIR, which is further discussed below in conjunction with the preferred step size variations used in accordance to the teachings of the present invention.

Figure 5:
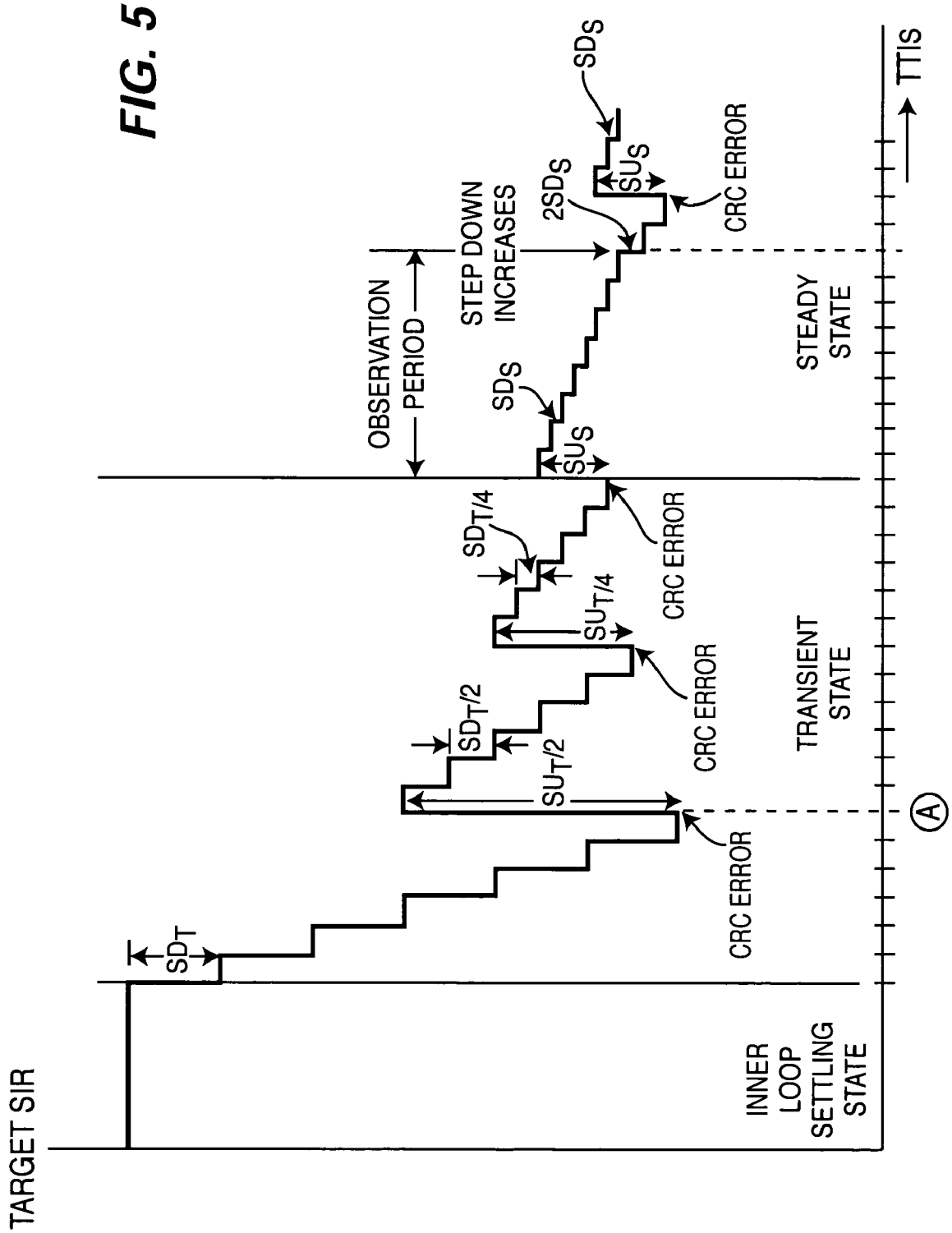
FIG. 5 illustrates a plot of target SIR adjustments of an exemplary WTRU downlink OLPC in accordance with the teachings of the present invention.

There are generally three states for down link outer loop power control: a preliminary inner loop settling state, a transient state, and a steady state. An example of the adjustments to target SIR during the different down link outer loop power control states in accordance with the invention is illustrated in FIG. 5. A method and system for adjusting downlink outer loop power to control target SIR is taught in International Application Number PCT/US 03/28412, filed Sep. 10, 2003 and corresponding U.S. patent application Ser. No. 10/659,673, filed Sep. 10, 2003 owned by the assignee of the present invention.

As shown in FIG. 5, target SIR is preferably maintained constant throughout the inner loop settling state. In the inner loop settling state, the inner loop TPC algorithm corrects the initial system systematic error and the random measurement error without changing the initial target SIR.

In the transient state, the outer loop power control algorithm attempts to correct the initial target SIR error caused by the channel condition mismatch. Initially, the jump algorithm in the transient state preferably uses a large step down size to decrease the target SIR rapidly, i.e., it forces a CRC error to occur. In the steady state, the outer loop power control algorithm attempts to maintain a target SIR by utilizing a relatively small step down size. One aspect invention of this exemplary WTRU downlink OLPC is to transition a relatively large step size initially used in the transient state to a smaller step size utilized in the steady state. Another aspect of this example is to increase the step size in the steady state where no CRC error occurs within a predetermined period.

In the transient state, a large initial step size $SS_{TS}$ can be calculated, for example, based upon the target BLER and a number $N_B$ of transport blocks per TTI for the reference transport channel RTrCH as follows:

$$SS_{TS} = 2[\log_{10}(1/BLER\_\text{target})]/N_B(dB) \quad \text{Equation 5}$$

For example, where $BLER\_\text{target} = 10^{-2}$ and $N_B = 2$, then $SS_{TS} = 2$. Then, through the application of equations 3 and 4 above, the initial step down and step up values for the transient state $SD_T$, $SU_T$ are $SD_T = 0.02$ and $SU_T = (2-0.02) = 1.98$.

The occurrence of CRC errors is used to trigger reduction in the step size until the transient state step size converges to the step size of the steady state $SS_{SS}$. For this example, the steady state $SS_{SS}$ is preferably calculated as follows:

$$SS_{SS} = 0.25[\log_{10}(1/BLER\_\text{target})]/N_B(dB) \quad \text{Equation 6}$$

Preferably, when a CRC error occurs during a TTI in the transient state, the step size is preferably reduced by ½. The reduced step size is then applied to the jump algorithm. The procedure iterates until the new step size converges to the step size of the steady state. For the above example, convergence occurs after three iterations since $SS_{TS} = 2^3 \cdot SS_{SS}$. Accordingly, for each TTI having a CRC error during the transient state, the next step size is preferably reduced from the initial step size $SS_{TS}$ by $½^n$, where n is the number of TTIs since the start of transient state that contained at least one CRC error, until the new step size converges to the step size of the steady state. When convergence occurs, the steady state is entered and no further reduction of step size occurs.

Figure 6:
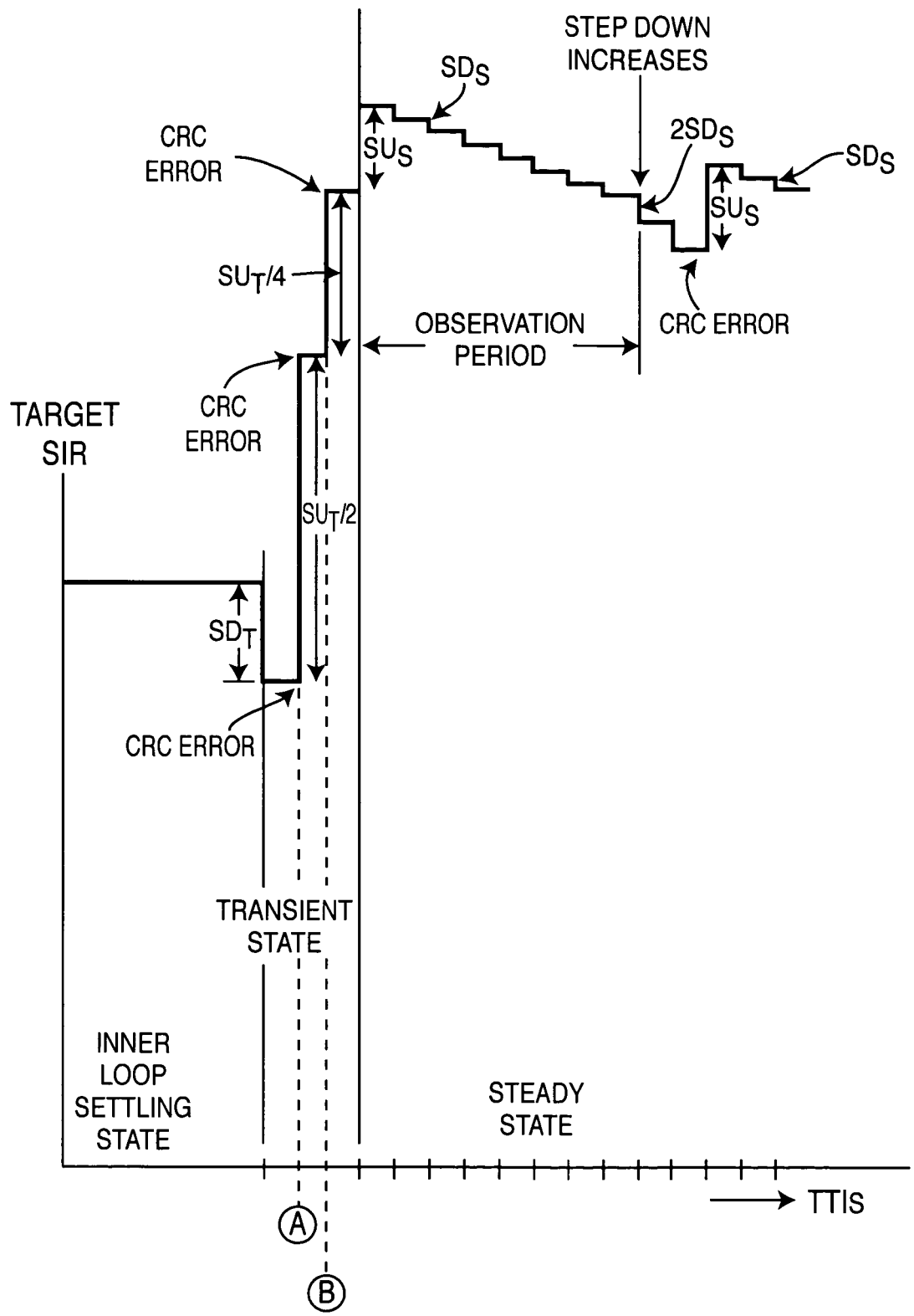
FIG. 6 illustrates a plot of target SIR adjustments of an exemplary WTRU downlink OLPC with a compressed transient state in accordance with the teachings of the present invention.

FIG. 5 provides a graphic illustration of the above example in practice. At a first CRC error at point A, the target SIR is increased by one half of a transient state step up $SU_T/2$. The CRC error also causes an adjustment in the step down size; subsequent transport blocks received without CRC error result in a decrease in target SIR by $SD_T/2$. When the next CRC error occurs, the step up size is reduced to $SU_T/4$, target SIR is increased by that amount, and the step down size is adjusted to $SD_T/4$. This algorithm continues until the adjusted step up size $SU_T$ equals the steady state step up size $SU_S$, which in the example shown in both FIGS. 5 and 6, is equal to $SU_T/8$. At this point, steady state is entered. The step up and step down sizes are fixed at $SU_S$ and $SD_S$, respectively.

The convergence to the steady state can be quite rapid where CRC errors are successively detected upon entering the transient state. FIG. 6 illustrates this for the above example where several transport blocks are received with CRC error immediately after the transient state is entered, resulting in successive decreases by a transient state step up $SU_T$ in the target SIR. As shown in FIG. 6, the initial CRC result indicates an error at point A, which results in a step up in target SIR by $SU_T/2$, and setting of the step down size to $SD_T/2$. FIG. 6 also illustrates the possibility where the first CRC result after a step up indicates an error. In such case as shown at point B, the target SIR is increased again, but by $SU_T/4$. To continue this worst case scenario, a CRC error occurs again at the third TTI in the transient state. The next target SIR step up adjustment becomes $SU_T/8$. Because this step up is equal to the predetermined steady state step up $SU_S$, the transient state ends at this point, and the steady state commences. The target SIR is consequently increased by $SU_S = SU_T/8$, and the step down size is set to $SD_S = SD_T/8$. Generally, any CRC error, regardless of when it occurs, will initiate a step up in target SIR by an amount that is half of the previous step up.

After the steady state is entered the step up and step down sizes are generally maintained at $SU_S$ and $SD_S$, respectively. Typically, where there is little change in the communication metrics, the steady state algorithm produces a series of successive step up and step down commands in a regular pattern (not shown) as is the case with the conventional jump algorithm. However, where the communication is subject to a rapid change in operating conditions due to changes in interference or other factors, application of the steady state algorithm can be less efficient. Accordingly, the steady state is varied from time to time to meet rapidly changing conditions.

During the steady state, when a predetermined observation period is passed with no CRC error occurrence, the step down size is preferably automatically increased. For example, as illustrated in FIGS. 5 and 6, after the passage of eight TTIs without a CRC error, the step down size is temporarily doubled so that the eighth and following consecutive step downs are twice the $SD_S$ amount.

It is preferable that the observation period be relatively long as it is assumed that the target SIR is close to convergence. Preferably, the observation period is set to 5/BLER consecutive transport blocks. The step down value $2SD_S$ remains fixed until a CRC error occurs, when it is then returned to $SD_S$. This improves the convergence time when a sudden improvement in channel conditions occurs, giving rise to an excessive measured SIR compared to the desired target SIR. The steady state continues for the life of the CCTrCH communication with this type of adjustment preferably being made whenever there is no CRC error in a time increment equal to the observation period.

Alternatively, when a predetermined observation period is passed with no CRC error occurrence, the process can revert back to the transient state to reduce convergence time, and then proceed to steady state once the target SIR converges in the same manner as before. In such case, for the above example, the step down value would switch from $SD_S$ to $SD_{TS}$ as defined above and then be incrementally reduced to the steady state value is CRC errors are detected.

For the case where more than one transport block is received per TTI (i.e., $N_B$>1) for the RTrCH within a CCTrCH, the target SIR is preferably adjusted as follows:

$$\text{target\_SIR} = \text{current\_target\_SIR} + (SU^*N_E) - SD^*(N_B - N_E) \quad \text{Equation 7}$$

where $N_E$ is defined as the number of CRC errors per TTI for the RTrCH. However, the step size is preferably only adjusted once per TTI at the beginning of the TTI and only if at least one CRC error is present in the TTI.

The outer loop algorithm described above is preferably implemented in a processor that computes the target SIR such as processor 36 of the open loop system illustrated in FIG. 2 and processor 74 of the closed loop system illustrated in FIG. 3. The implementation of the algorithm determines whether any CRC errors occur in a new TTI, adjusts the step up and step down sizes appropriately, then applies the step adjustments based on the individual CRC results. For example, consider a TTI with four transport blocks (i.e., $N_B$=4), where three of the transport blocks contain a CRC error. If the step up size is $SU_T/2$ and the step down size is $SD_T/2$ prior to this TTI, the outer loop algorithm first adjusts the step sizes to $SU_T/4$ and $SD_T/4$, then updates the target SIR appropriately. The net result is that adjusted target_SIR=current_target_SIR+3($SU_T/8$)−($SD_T/8$).

For a 3GPP system, in both the transient and steady states, if the RTrCH is reselected (e.g., for variable bit rate services) and the target BLER of that new RTrCH is different from the old, then the SIR step sizes are recalculated based on the new target BLER. In steady state, the observation period is also updated, and the current count of blocks without error is reset to 0. In transient state, in addition to recalculating the step sizes, an additional adjustment is made to account for the convergence that may already have occurred in this state. In other words, the initial step up SU or step down SD values are not applied, but rather the current adjustment for detected CRC errors is applied. As before, the fractional step up or step down size is calculated with a factor $1/2^n$, where n is the number of TTIs since the start of transient state that contained at least one CRC error. For example, if the current step down size before RTrCH reselection is $SD_{Told}/4$, then the step down size immediately after RTrCH reselection must be set to $SD_{Tnew}/4$ and the step up size must be set to $SU_{Tnew}/4$.

Figure 7A:
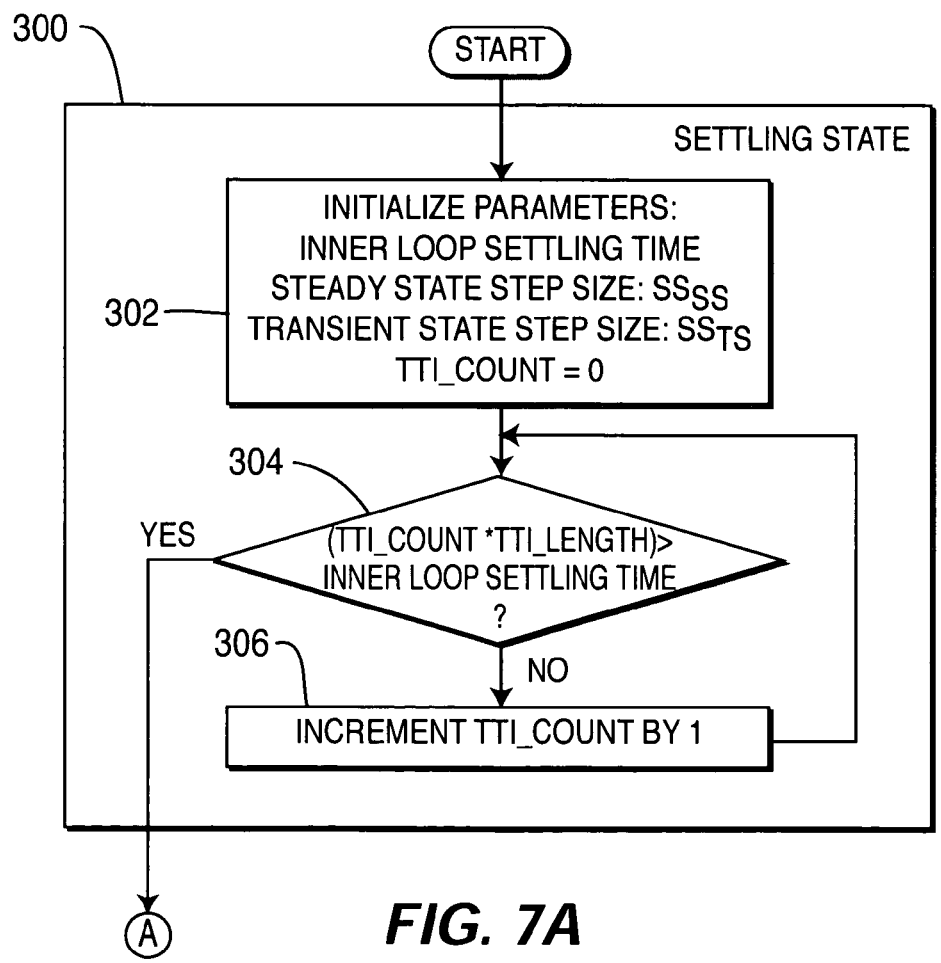
FIGS. 7A–7C illustrate a method flowchart of an exemplary downlink OLPC algorithm in accordance with the teachings of the present invention.
Figure 7B:
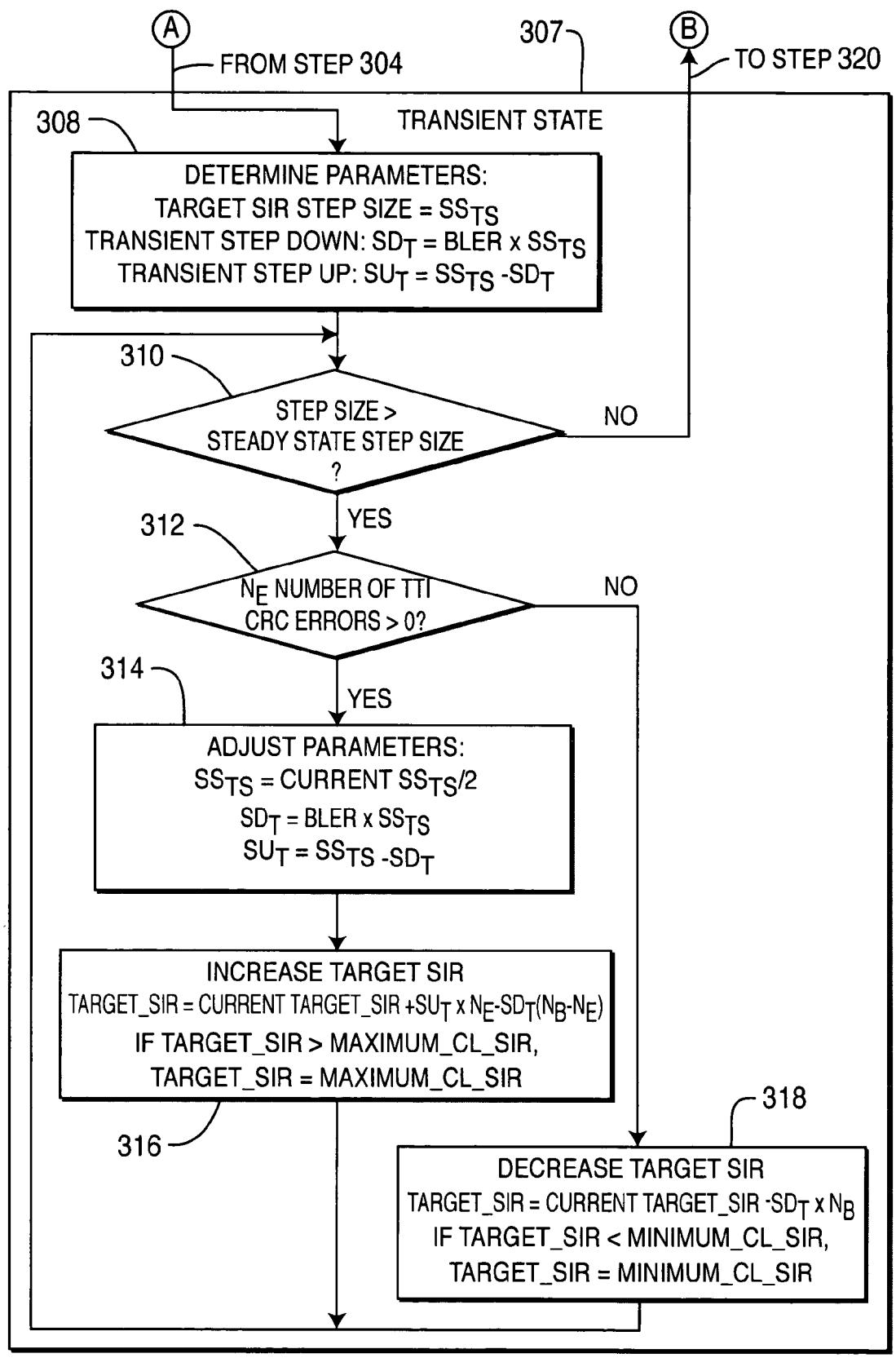
Figure 7C:
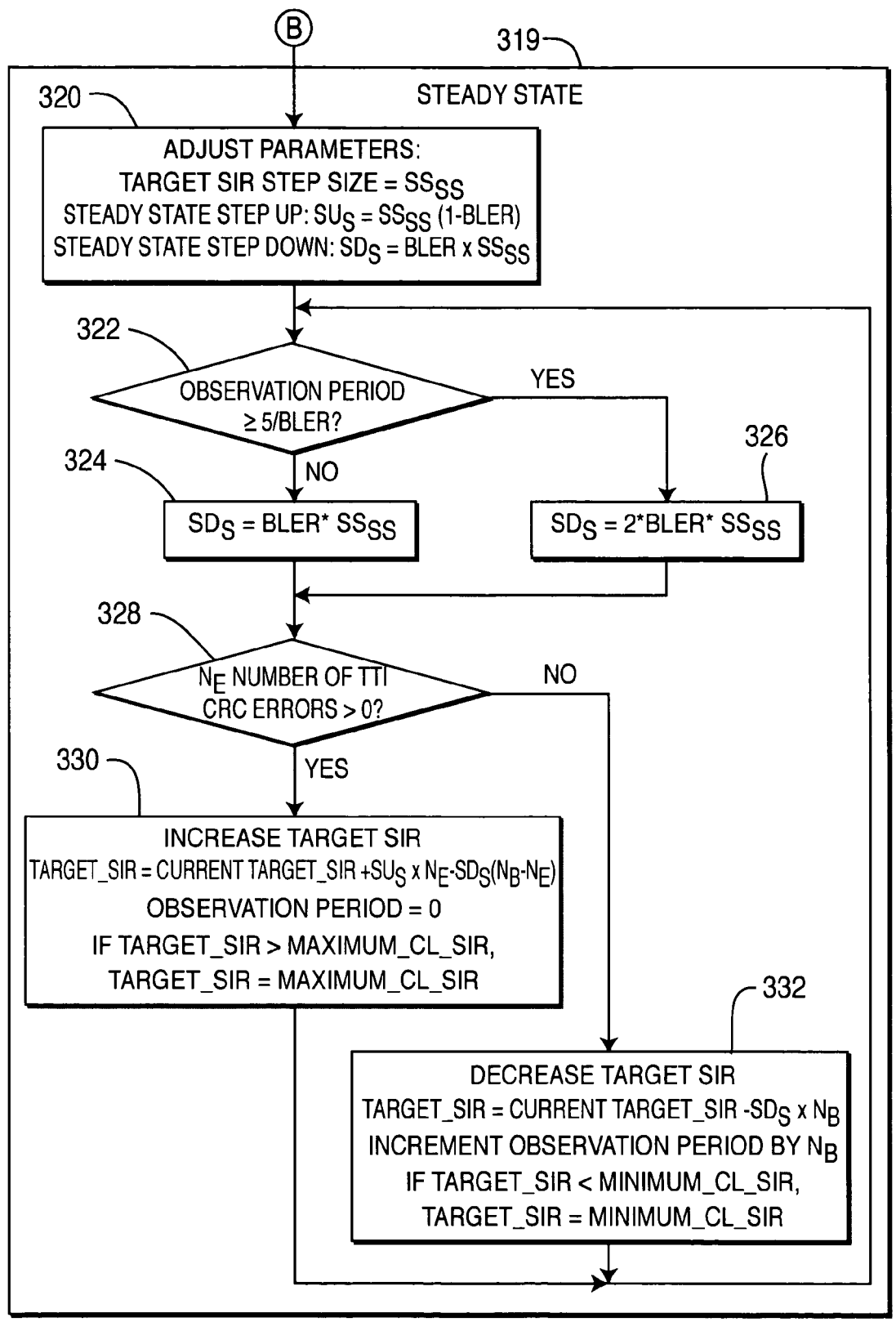

In FIGS. 7A–7C a flowchart for implementing the preferred algorithm for downlink outer loop power control in a 3GPP system is provided. In FIG. 7A, stage 300 represents preferred procedures during the inner loop settling state. In step 302, the parameters for inner loop settling time, transient state step size $SS_{TS}$, steady state step size $SS_{SS}$, and TTI count are initialized. The inner loop settling time is preferably set to 100 ms. The values for transient state step size $SS_{TS}$ and steady state step size $SS_{SS}$ are initialized according to Equations 6 and 7 above, respectively. The value for the TTI count is set to zero (0).

In step 304, a comparison is made between the product (TTI count*TTI length) and inner loop settling time. If the product is greater than the inner loop settling time, then the settling state is complete, and the power control algorithm proceeds to the transient state. If not, the TTI count is incremented by one (1) in step 306, and the settling state returns to step 304 for another comparison. Thus, the algorithm stage 300 assures that enough TTIs have elapsed to allow the inner loop power control to correct initial systematic error and random measurement error.

In FIG. 7B, stage 307 represents preferred procedures for downlink outer loop power control which occur during the transient state. Step 308 is initiated by the affirmative decision of step 304 from the FIG. 7A portion of the flow chart. In step 308, the transient state parameters are initialized. The step size is preferably set to $SS_{TS}$ according to Equation 5, the transient state step down is the step size factored by the BLER value (i.e., $SD_T$=BLER*$SS_{TS}$), and the transient state step up $SU_T$ is the difference between the step size $SS_{TS}$ and the step down value $SD_T$ (i.e., $SU_T = SS_{TS} - SD_T$).

In Step 310, a comparison is made between the step size $SS_{TS}$ and the steady state step size $SS_{SS}$. The initial value for $SS_{TS}$ is according to Equation 6 as determined in step 302. In step 310, a decision is made as to whether step size $SS_{TS}$ is greater than steady state step size $SS_{SS}$. If not, the transient state is complete and the algorithm proceeds to step 320 of the FIG. 7C portion of the flow chart. If so, the method proceeds to step 312 where it is checked whether $N_E$ number of TTI CRC errors are at least one in number. If not, the method proceeds to step 318 where the target SIR is decreased according to the following equation:

$$\text{target\_SIR} = \text{current\_target\_SIR} - SD_T^*N_B \quad \text{Equation 8}$$

In step 318, Target SIR is set to at least a minimum value MIN_DL_SIR. That is, if target SIR is less than a predetermined value MIN_DL_SIR, the target SIR is then set equal to that minimum value. With step 318 complete, the process returns to step 310 with the newly decreased target SIR.

Returning to step 312, if at least one CRC error has been detected for the current TTI, the parameters for step size $SS_{TS}$, step up $SU_T$ and step down $SD_T$ are adjusted in step 314 as follows. The transient state step size $SS_{TS}$ is set to half of the current value of $SS_{TS}$. The step up $SU_T$ and step down $SD_T$ values are readjusted according to the new value of the step size $SS_{TS}$ for the transient state according to Equations 3 and 4.

In step 316, the target SIR is increased according to the following equation:

$$\text{target\_SIR} = \text{current\_target\_SIR} + (SU_T^*N_E) - SD_T(N_B - N_E) \quad \text{Equation 9}$$

The new target SIR value is checked for being no greater than a predetermined maximum value MAX_DL_SIR. If the new target SIR is found to be greater than this maximum value, the new target SIR is reset to maximum value MAX_DL_SIR. The transient state continues by returning to step 310 and repeating the cycle until the transient state step size becomes greater than the steady state step size in step 310.

In FIG. 7C, stage 319 represents preferred procedures for the steady state portion of downlink outer loop power control. In step 320, parameters are adjusted for the steady state including the SIR step size and the steady state step up value $SU_S$. The SIR step size is set to the steady state step size $SS_{SS}$ determined in step 302. The step up value $SU_S$ is calculated according to Equation 3 using the steady state step size $SS_{SS}$. In step 322 an observation period is checked for being greater than or equal to 5/BLER. Initially the observation period will be less than 5/BLER, in which case step 324 commences where step down value $SD_S$ is equal to BLER*$SS_{SS}$.

In step 328, a check for whether at least one CRC error for the TTI is detected. If so, step 330 commences where the target SIR is increased as follows:

$$\text{target\_SIR} = \text{current target\_SIR} + (SU_S * N_E) - SD_S(N_B - N_E) \quad \text{Equation 10}$$

The observation period is reset to zero due to the detection of a CRC error. If the new target SIR is greater than value MAX_DL_SIR, a new target SIR is set to the maximum value MAX_DL_SIR. Otherwise, the target SIR remains at the calculated value by Equation 10. The process returns to step 322 to examine the observation period. Once the observation period is greater than or equal to 5/BLER, step 326 commences where step down value $SD_S$ is doubled. The process then proceeds to step 328 for checking for CRC errors. If no CRC errors are detected, step 332 begins where the target SIR is decreased according to the following:

$$\text{target\_SIR} = \text{current\_target\_SIR} - (SD_S * N_B) \quad \text{Equation 11}$$

If this new target SIR value is less than a minimum value MIN_DL_SIR, the new target SIR is set to the minimum value MIN_DL_SIR. Otherwise, it remains at the calculated value. Following step 332, the algorithm state 319 returns to step 322, and the algorithm 319 then repeats until the CCTrCH becomes inactive.

Specifically for NRT data transmissions over Temp_DCH allocations, the following summarizes the preferred process for Temp_DCH allocations subsequent to the first. The initial target SIR is taken from the last target SIR left by the previous Temp DCH allocation. This initial target SIR value is upper-bounded by the initial target SIR (from the initial mapping look-up table) plus an upper bound margin, and lower-bounded by initial target SIR (from the initial mapping look-up table) minus a lower bound margin. The initial target SIR is also adjusted based on the data rate and required BLER of a new Temp-DCH allocation. In case the inter-arrival time of Temp-DCH allocation request is too long (e.g., 10 sec.), then a linear combination of the initial target SIR from a RNC lookup table and the bounded target SIR from the previous Temp-DCH allocation with appropriate weights (i.e. factored to account for the inter arrival time) is used. Once the initial target SIR is finally determined including the above described adjustments for a given Temp-DCH allocation, the target SIR value will not be allowed to exceed or fall below this initial target SIR value by a given margin during the outer loop power control operation for that Temp-DCH allocation.

Figure 8:
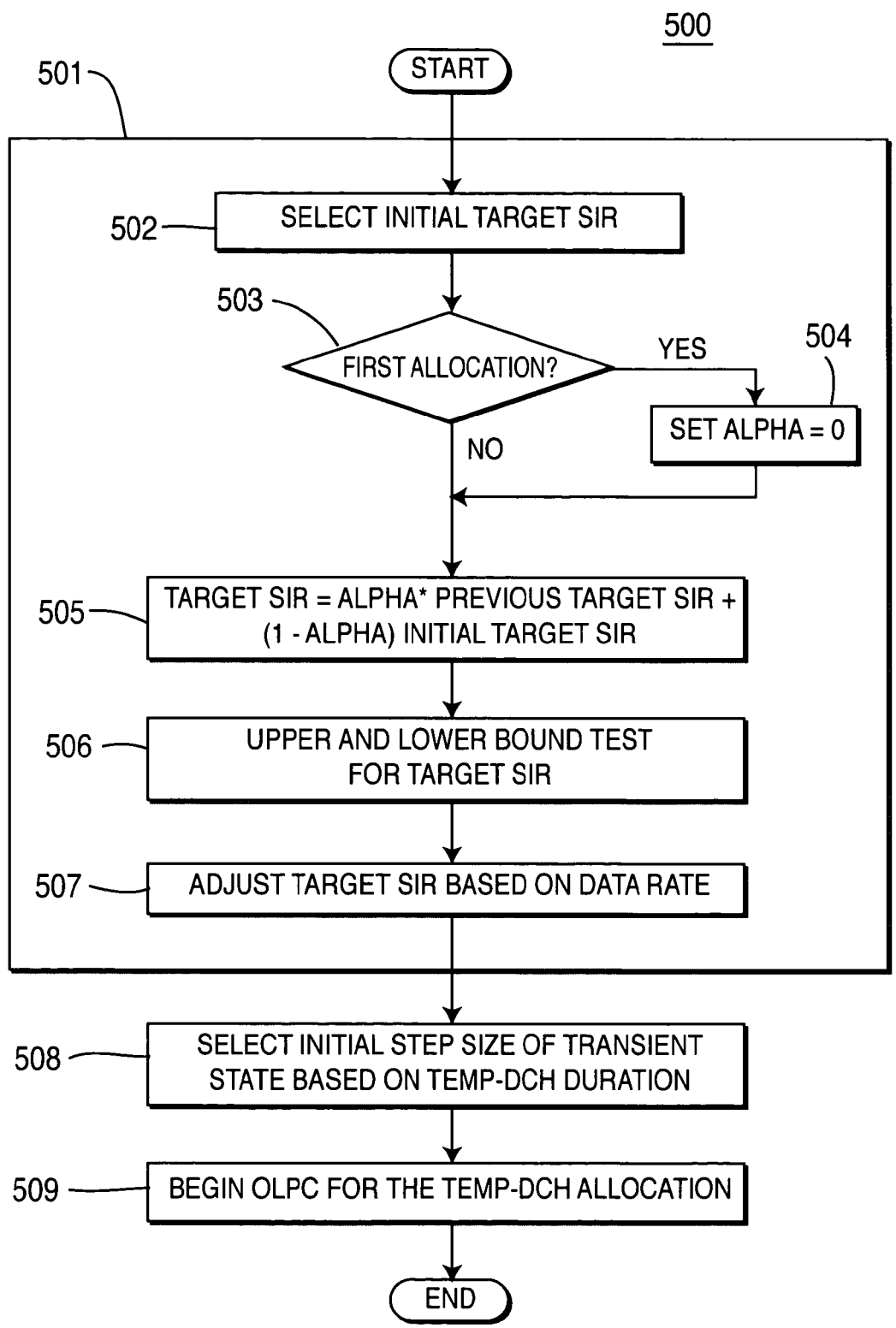
FIG. 8 illustrates a flowchart of an enhanced OLPC algorithm for NRT data in accordance with the teachings of the present invention.

In FIG. 8, a flowchart for implementing an algorithm 500 with an enhancement of downlink outer loop power control, particularly for NRT data allocations to Temp-DCH using target SIR history. The process results in selection of an initial transient state step size for a jump algorithm described above, but based on duration of Temp-DCH allocation. Stage 501 provides preferred procedures for producing an adjusted initial target SIR for each Temp-DCH allocation.

In step 502, an initial target SIR is selected by use of the modified conventional method as described above for the beginning of a radio link setup for a WTRU or in each handover. In step 503, the Temp-DCH is checked for whether it is a first allocation, i.e. the beginning of a radio link setup for a WTRU or in each handover. If so, step 504 initiates a parameter alpha to zero. If not, algorithm 500 proceeds directly to step 505, where a new initial target SIR for this Temp-DCH allocation is adjusted by the following equation to compensate for inter-arrival time between allocations:

$$\text{target\_SIR}(j) = (alpha)*(\text{target\_SIR}(j-1)) + (1-alpha)* (\text{initial\_target\_SIR}) \quad \text{Equation 12}$$

where j represents the current Temp-DCH allocation, target_SIR(j−1) represents the last target SIR of the previous Temp-DCH allocation, and initial_target SIR is the initial target SIR determined from the mapping lookup table. The alpha factor is a forgetting factor to account for the inter arrival time between the beginning of the current Temp-DCH allocation and the end of the previous Temp-DCH allocation (e.g., alpha=exp(−T/10) for T inter arrival time).

In step 506, upper and lower bound tests for the calculated target SIR is performed according to the values MIN_DL_SIR and MAX_DL_SIR. If value target_SIR is greater than a predetermined maximum value MAX_DL_SIR, then the target_SIR value is set to this maximum value instead of the calculated value. On the other hand, if target_SIR is less than the predetermined minimum value MIN_DL_SIR, then the target_SIR value is set to this minimum value rather than the calculated value. In step 507, the target SIR is adjusted based on the data rate.

Next in step 508, initial transient state step size is determined based on duration of Temp-DCH allocation. The RNC sends the Temp-DCH allocation duration information encoded at the header of the NRT data burst, preferably in terms of number of TTIs. The WTRU receives and decodes the Temp-DCH allocation duration accordingly. Step 508 corresponds to step 308 of FIG. 7B, but is modified for Temp-DCH processing. The following step size selections are described in terms of preferable ranges for Temp-DCH allocation. If the duration of a Temp-DCH allocation is less than 100 TTIs (at 90 to 95% in cumulative density function the initial transient step size is equal to the steady state step size (i.e., SIR_step_size_TS=SIR_step_size_SS).

If the duration of a Temp-DCH allocation between 100 to 200 TTIs, then the initial transient step size is equal to twice the steady state step size (i.e., SIR_step_size_TS=2 SIR_step_size_SS), and outer loop power control will move from transient state to steady state after one CRC error occurrence.

If the duration of a Temp-DCH allocation is between 200 and 400 TTIs, then SIR_step_size_TS=4 SIR_step_size_SS, and the outer loop power control move from transient state to steady state after two CRC error occurrences.

Finally, if the duration of a Temp-DCH allocation is greater than 400 TTIs, then SIR_step_size_TS=8 SIR_step_size_SS, which is the same as the RT initial transient step size. The outer loop power control will move from transient state to steady state after three CRC error occurrences where the example described above is implemented.

After step 508, the outer loop power control starts for the current Temp_DCH allocation, in step 509 according to the enhanced outer loop power control of FIGS. 7B–7C.

Algorithm 500 repeats with each new Temp-DCH allocation.

It is to be noted that while the foregoing description refers to NRT data as an example, the invention is applicable to RT also which is of relatively short duration. It is to be further noted that the parameters comprising Temp_DCH duration, target SIR margins, and inter-arrival time of Temp_DCH allocation requests can be varied to obtain better performance.

Preferably, the components that implement the algorithms illustrated in FIGS. 5–8 are implemented on an single integrated circuit, such as an application specific integrated circuit (ASIC). However, portions of the algorithms may also be readily implemented on multiple separate integrated circuits.

The foregoing description makes references to outer loop power control in the context of a 3GPP system as an example only and not as a limitation. The invention is applicable to other systems of wireless communication including GSM, 2G, 2.5G or any other type of wireless communication system where the equivalent of outer loop power control is implemented. Other variations and modifications consistent with the invention will be recognized by those of ordinary skill in the art.

What is claimed is:

1. A method of transmission power control for a wireless transmit receive unit (WTRU) that transmits data signals in a forward channel in selectively sized block allocations where the WTRU is configured to make forward channel power adjustments as a function of target metrics computed based on the data signals as received over the forward channel, the method comprising:
   receiving data signals from the WTRU in a block allocation having a predetermined size S on the forward channel;
   computing target metrics for the WTRU's forward channel power adjustments based on the detection of predetermined error conditions in the signals received on the forward channel including:
   setting an initial target metric value; and
   after a preliminary period at the initial value, changing the target metric by a step up or a step down amount at time intervals of a predetermined length whereby the target metric is increased by the step up amount if a predetermined error condition has been detected in an immediately preceding time interval or is decreased by the step down amount if the predetermined error condition has not been detected the immediately preceding time interval; and
   setting the step down amount at an initial transient state level based on the predetermined block allocation size S, such that the initial step down amount is set at a level at least as great as a predetermined step down amount for a steady state steady state level and, where the initial step down amount is greater than the predetermined step down amount for the steady state steady state level, reducing the step down amount by a selected amount to a lower level if a predetermined error condition has been detected in an immediately preceding time interval until the step down amount is reduced to the predetermined step down amount for the steady state steady state level.

2. The method of claim 1 where the step up amount has a defined correspondence with the step down amount for each level wherein the computing target metrics further includes increasing the step up and step down amounts by a selected amount if a predetermined error condition has not been detected in a predetermined number of time intervals while the step down amount is set at the steady state level.

3. The method of claim 1 where the step up amount has a defined correspondence with the step down amount for each level, the target metrics are target signal to interference ratios (SIRs) and cyclic redundancy checks are conducted to detect the predetermined error condition.

4. The method of claim 3 wherein step up amounts are significantly greater than respective step down amounts, the initial transient level step down amount is a factor of $2^n$ of the predetermined step down amount for the steady state steady state level, where n is non-negative integer, and where the step down amount is reduced, reduction is by a factor of ½.

5. The method of claim 4 wherein the computing target metrics further includes increasing the step up and step down amounts by a factor of 2 if a predetermined error condition has not been detected in a predetermined number of time intervals while the step down amount is set at the steady state level.

6. The method of claim 4 wherein block allocation sizes S are defined in increments of Transmission Time Intervals (TTIs) and the initial step down amount is set such that n=0 for S<100 TTIs, n=1 for 100 TTIs≦S<200 TTIs, n=2 for 200 TTIs≦S <400 TTIs and n=3 for S>400 TTIs.

7. The method of claim 6 wherein the method is implemented in a Universal Mobile Telecommunications System (UMTS) where the WTRU is a network unit that transmits user signals on a downlink channel and the computing of target metrics is performed by a WTRU that receives the downlink channel and produces power step commands that are transmitted to the network unit on an uplink channel.

8. The method of claim 3 wherein the WTRU is a network unit that transmits user signals on a downlink channel and the computing of target metrics is performed by a WTRU that receives the downlink channel.

9. The method of claim 3 wherein the WTRU transmits user signals on an uplink channel and the computing of target metrics is performed by a network unit that receives the uplink channel.

10. The method of claim 3 in which open loop transmission power control for the WTRU is implemented further comprising receiving the computed target SIRs by the WTRU on a reverse channel such that the WTRU computes power adjustments for forward channel transmissions based on received target SIRs.

11. The method of claim 3 in which closed loop transmission power control for the WTRU is implemented further comprising:
   producing power step commands as a function of the computed target SIRs and transmitting the power step commands on a reverse channel; and
   receiving the power step commands by the WTRU on the reverse channel and computing power adjustments for forward channel transmissions based on the received power step commands.

12. A receiving wireless transmit receive unit (WTRU) for implementing transmission power control for a transmitting WTRU that transmits data signals in a forward channel in selectively sized block allocations where the transmitting WTRU is configured to make forward channel transmission power adjustments as a function of target metrics computed by the receiving WTRU, the receiving WTRU comprising:

a receiver for receiving data signals in a block allocation having a predetermined size S from a transmitting WTRU on a forward channel;

a processor for computing target metrics for implementing forward channel transmission power adjustments in the transmitting WTRU based on the detection of predetermined error conditions in the data signals received on the forward channel; and said processor configured to compute target metrics such that:

after a preliminary period at an initial value, the target metric is changed by a step up or a step down amount at time intervals of a predetermined length whereby the target metric is increased by the step up amount if a predetermined error condition has been detected in an immediately preceding time interval or the target metric is decreased by the step down amount if the predetermined error condition has not been detected in the immediately preceding tune interval;

the step down amount is set at an initial transient state level based on the predetermined block allocation size S, such that the initial step down amount is set at a level at least as great as a predetermined step down amount for a steady state steady state level; and where the initial step down amount is greater than the predetermined step down amount for the steady state steady state level, the step down amount is reduced by a selected amount to a lower level if a predetermined error condition has been detected in an immediately preceding time interval until the step down amount is reduced to the predetermined step down amount for the steady state steady state level.

13. The invention of claim 12 wherein said processor is further configured to compute target metrics such that the step up amount has a defined correspondence with the step down amount for each level and the step up and step down amounts are increased by a selected amount if a predetermined error condition has not been detected in a predetermined number of time intervals while the step down amount is set at the steady state level.

14. The invention of claim 12 in which the target metrics are target signal to interference ratios (SIRs) wherein said processor is further configured to compute target metrics such that the step up amount has a defined correspondence with the step down amount for each level and the receiving WTRU is configured to conduct cyclic redundancy checks to detect the predetermined error condition.

15. The invention of claim 14 wherein said processor is configured to compute target metrics such that step up amounts are significantly greater than respective step down amounts, the initial transient level step down amount is a factor of $2^n$ of the predetermined step down amount for the steady state steady state level, where n is non-negative integer, and where the step down amount is reduced, reduction is by a factor of $\frac{1}{2}$.

16. The invention of claim 15 wherein said processor is further configured to compute target metrics such that the step up and step down amounts are increased by a factor of 2 if a predetermined error condition has not been detected in a predetermined number of time intervals while the step down amount is set at the steady state level.

17. The invention of claim 15 wherein block allocation sizes S are defined in increments of Transmission Time Intervals (TTIs) and said processor is further configured to compute target metrics such that the initial step down amount is set such that n=0 for S<100 TTIs, n=1 for 100 TTIs$\leq$S<200 TTIs, n=2 for 200 TTIs$\leq$S<400 TTIs and n=3 for S>400 TTIs.

18. The invention of claim 17 which is implemented for use in a Universal Mobile Telecommunications System (UMTS) where the WTRU is a network unit that transmits user signals on a downlink wherein the receiving WTRU is configured to compute target metrics based on the detection of predetermined error conditions in the data signals received on the downlink channel.

19. The invention of claim 14 where the transmitting WTRU is a network unit that transmits user signals on a downlink channel wherein the receiving WTRU is configured to compute target metrics based on the detection of predetermined error conditions in the data signals received on the downlink channel.

20. The invention of claim 14 where the transmitting WTRU transmits user signals on an uplink channel wherein the receiving WTRU is configured to compute target metrics based on the detection of predetermined error conditions in the data signals received on the uplink channel.

21. The invention of claim 14 in which open loop transmission power control for the transmitting WTRU is implemented wherein the receiving WTRU further comprising a transmitter configured to transmit the computed target SIRs on a reverse channel to the transmitting WTRU.

22. The invention of claim 14 in which closed loop transmission power control for the transmitting WTRU is implemented wherein the receiving WTRU processor is further configured to produce power step commands as a function of the computed target SIRs and the receiving WTRU further comprising a transmitter configured to transmit the power step commands on a reverse channel to the transmitting WTRU.

23. A method of transmission power control for a wireless transmit receive unit (WTRU) that transmits data signals in a forward channel in selectively sized block allocations where the WTRU is configured to make forward channel power adjustments as a function of target metrics computed based on the data signals as received over the forward channel, the method comprising:

receiving a series of block allocations of data signals spaced apart in time from the WTRU on the forward channel;

for the data signals of each block allocation, computing target metrics for the WTRU's forward channel power adjustments based on the detection of predetermined error conditions in the signals received on the forward channel including setting an initial target metric value and storing a last target metric computed for each block allocation of data; and for the data signals of each block allocation after a first block allocation, setting the initial target metric value as a function of the last target metric computed for an immediately preceding block allocation and an inter-allocation adjustment based on the time spacing from the immediately preceding block allocation.

24. The method of claim 23 where each the block allocation has a predetermined size S wherein the computing target metrics for the WTRU's forward channel power adjustments based on the detection of predetermined error conditions in the signals received on the forward channel further includes: after a preliminary period at the initial value, changing the target metric by a step up or a step down amount at time intervals of a predetermined length whereby the target metric is increased by the step up amount if a predetermined error condition has been detected in an immediately preceding time interval or is decreased by the step down amount if the predetermined error condition has not been detected the immediately preceding time interval; and setting the step down amount at an initial transient state level based on the predetermined block allocation size S, such that the initial step down amount is set at a level at least as great as a predetermined step down amount for a steady state steady state level and, where the initial step down amount is greater than the predetermined step down amount for the steady state steady state level, reducing the step down amount by a selected amount to a lower level if a predetermined error condition has been detected in an immediately preceding time interval until the step down amount is reduced to the predetermined step down amount for the steady state steady state level.

25. The method of claim 23 wherein the inter-allocation adjustment is determined by (alpha*previous_target_SIR)+((1−alpha)*initial_target_SIR)), where alpha is a forgetting factor to compensate for longer than expected inter-allocation time, previous_target_SIR is the target metric from the previous block allocation, and initial_target_SIR is the first target metric.

26. The method of claim 23 further comprising an upper and lower bound test for setting the initial target metric, where the upper bound is a first predetermined value added to the initial value and the lower bound is a second predetermined value subtracted from the initial value.

27. The method of claim 23 further comprising an adjustment to the target metric based on data rate.

28. The method of claim 23 where the step up amount has a defined correspondence with the step down amount for each level, the target metrics are target signal to interference ratios (SIRs) and cyclic redundancy checks are conducted to detect the predetermined error condition.

29. The method of claim 28 wherein step up amounts are significantly greater than respective step down amounts, the initial transient level step down amount is a factor of $2^n$ of the predetermined step down amount for the steady state steady state level, where n is non-negative integer, and where the step down amount is reduced, reduction is by a factor of ½.

30. The method of claim 29 wherein the computing target metrics further includes increasing the step up and step down amounts by a factor of 2 if a predetermined error condition has not been detected in a predetermined number of time intervals while the step down amount is set at the steady state level.

31. The method of claim 29 wherein block allocation sizes S are defined in increments of Transmission Time Intervals (TTIs) and the initial step down amount is set such that n=0 for S<100 TTIs, n=1 for 100 TTIs≦S<200 TTIs, n=2 for 200 TTIs≦S<400 TTIs and n=3 for S≧400 TTIs.

32. The method of claim 31 wherein the method is implemented in a Universal Mobile Telecommunications System (UMTS) where the WTRU is a network unit that transmits user signals on a downlink channel and the computing of target metrics is performed by a WTRU that receives the downlink channel and produces power step commands that are transmitted to the network unit on an uplink channel.

33. The method of claim 28 wherein the WTRU is a network unit that transmits user signals on a downlink channel and the computing of target metrics is performed by a WTRU that receives the downlink channel.

34. The method of claim 28 wherein the WTRU transmits user signals on an uplink channel and the computing of target metrics is performed by a network unit that receives the uplink channel.

35. The method of claim 28 in which open loop transmission power control for the WTRU is implemented further comprising receiving the computed target SIRs by the WTRU on a reverse channel such that the WTRU computes power adjustments for forward channel transmissions based on received target SIRs.

36. A receiving wireless transmit receive unit (WTRU) for implementing transmission power control for a transmitting WTRU that transmits data signals in a forward channel in selectively sized block allocations where the transmitting WTRU is configured to make forward channel transmission power adjustments as a function of target metrics computed by the receiving WTRU, the receiving WTRU comprising:

a receiver for receiving a series of block allocations of data signals spaced apart in time from the WTRU on the forward channel;

a processor for computing target metrics for implementing forward channel transmission power adjustments in the transmitting WTRU based on the detection of predetermined error conditions in the data signals received on the forward channel; and said processor configured to compute target metrics such that:

for the data signals of each block allocation, an initial target metric value is set and a last target metric computed for each block allocation of data is stored; and for the data signals of each block allocation after a first block allocation, the initial target metric value is set as a function of the stored last target metric computed for an immediately preceding block allocation and the time spacing from the immediately preceding block allocation.

37. The invention of claim 36 where each block allocation has a predetermined size S wherein said processor is further configured to compute target metrics such that:

after a preliminary period at an initial value, the target metric is changed by a step up or a step down amount at time intervals of a predetermined length whereby the target metric is increased by the step up amount if a predetermined error condition has been detected in an immediately preceding time interval or the target metric is decreased by the step down amount if the predetermined error condition has not been detected in the immediately preceding time interval;

the step down amount is set at an initial transient state level based on the predetermined block allocation size S, such that the initial step down amount is set at a level at least as great as a predetermined step down amount for a steady state steady state level; and where the initial step down amount is greater than the predetermined step down amount for the steady state steady state level, the step down amount is reduced by a selected amount to a lower level if a predetermined error condition has been detected in an immediately preceding time interval until the step down amount is reduced to the predetermined step down amount for the steady state steady state level.

38. The invention of claim 36 wherein the inter-allocation adjustment is determined by (alpha*previous_target_SIR)+((1−alpha)*initial_target_SIR)), where alpha is a forgetting factor to compensate for longer than expected inter-allocation time, previous_target_SIR is the target metric from the previous block allocation, and initial_target_SIR is the first target metric.

39. The invention of claim 36 wherein the processor is further configured to perform an upper and lower bound test for setting the initial target metric, where the upper bound is a first predetermined value added to the initial value and the lower bound is a second predetermined value subtracted from the initial value.

40. The invention of claim 36 wherein the processor is further configured to adjust the target metric based on data rate.

41. The invention of claim 36 in which the target metrics are target signal to interference ratios (SIRs) wherein said processor is further configured to compute target metrics such that the step up amount has a defined correspondence with the step down amount for each level and the receiving WTRU is configured to conduct cyclic redundancy checks to detect the predetermined error condition.

42. The invention of claim 41 wherein said processor is configured to compute target metrics such that step up amounts are significantly greater than respective step down amounts, the initial transient level step down amount is a factor of $2^n$ of the predetermined step down amount for the steady state steady state level, where n is non-negative integer, and where the step down amount is reduced, reduction is by a factor of ½.

43. The invention of claim 42 wherein said processor is further configured to compute target metrics such that the step up and step down amounts are increased by a factor of 2 if a predetermined error condition has not been detected in a predetermined number of time intervals while the step down amount is set at the steady state level.

44. The invention of claim 42 wherein block allocation sizes S are defined in increments of Transmission Time Intervals (TTIs) and said processor is further configured to compute target metrics such that the initial step down amount is set such that n=0 for S<100 TTIs, n=1 for 100 TTIs≦S<200 TTIs, n=2 for 200 TTIs≦S<400 TTIs and n=3 for S≧400 TTIs.

45. The invention of claim 44 which is implemented for use in a Universal Mobile Telecommunications System (UMTS) where the WTRU is a network unit that transmits user signals on a downlink wherein the receiving WTRU is configured to compute target metrics based on the detection of predetermined error conditions in the data signals received on the downlink channel.

46. The invention of claim 41 where the transmitting WTRU is a network unit that transmits user signals on a downlink channel wherein the receiving WTRU is configured to compute target metrics based on the detection of predetermined error conditions in the data signals received on the downlink channel.

47. The invention of claim 41 where the transmitting WTRU transmits user signals on an uplink channel wherein the receiving WTRU is configured to compute target metrics based on the detection of predetermined error conditions in the data signals received on the uplink channel.

48. The invention of claim 41 in which open loop transmission power control for the transmitting WTRU is implemented wherein the receiving WTRU further comprises a transmitter configured to transmit the computed target SIRs on a reverse channel to the transmitting WTRU.

49. The invention of claim 41 in which closed loop transmission power control for the transmitting WTRU is implemented wherein the receiving WTRU processor is further configured to produce power step commands as a function of the computed target SIRs and the receiving WTRU further comprising a transmitter configured to transmit the power step commands on a reverse channel to the transmitting WTRU.

* * * * *

UNITED STATES PATENT AND TRADEMARK OFFICE
CERTIFICATE OF CORRECTION

PATENT NO. : 7,218,949 B2
APPLICATION NO. : 10/721392
DATED : May 15, 2007
INVENTOR(S) : Koo et al.

It is certified that error appears in the above-identified patent and that said Letters Patent is hereby corrected as shown below:

At column 2, line 4, after the words "RNC that", delete "control" and insert therefor --controls--.

At column 4, line 47, after the word "likely", insert --to--.

At column 5, line 15, after the word "value", delete "are" and insert therefor --is--.

At column 5, line 25, after the word "detected", insert --in--.

At column 5, lines 30, 33 and 37, before the second occurrence of "steady state", delete "steady state".

At column 6, lines 8, 10 and 15 before the second occurrence of "steady state", delete "steady state".

At column 13, line 22, before "CRC", delete "is" and insert therefor --if--.

At column 16, line 28, after the word "lower", delete "bound" and insert therefor --boundary--.

At column 16, line 60, delete the word "move" and insert therefor --moves--.

At claim 1, column 17, line 51, after the word "detected", insert --in--.

At claim 1, column 17, lines 57, 59 and 65 before the second occurrence of "steady state", delete "steady state".

At claim 4, column 18, line 14, before the second occurrence of "steady state", delete "steady state".

At claim 6, column 18, line 28, delete "S>400" and insert therefor --S$\geq$400--.

UNITED STATES PATENT AND TRADEMARK OFFICE
CERTIFICATE OF CORRECTION

PATENT NO. : 7,218,949 B2
APPLICATION NO. : 10/721392
DATED : May 15, 2007
INVENTOR(S) : Koo et al.

It is certified that error appears in the above-identified patent and that said Letters Patent is hereby corrected as shown below:

At claim 12, column 19, line 19, after the word "preceding", delete "tune" and insert therefor --time--.

At claim 12, column 19, lines 24, 27 and 34 before the second occurrence of "steady state", delete "steady state".

At claim 15, column 19, line 55, before the second occurrence of "steady state", delete "steady state".

At claim 17, column 20, line 3, delete "S>400" and insert therefor --S≥400--.

At claim 24, column 20, line 58, after the word "each", delete "the".

At claim 24, column 21, line 4, after the word "detected", insert --in--.

At claim 24, column 21, lines 10, 12, and 18 before the second occurrence of "steady state", delete "steady state".

At claim 29, column 21, line 41, before the second occurrence of "steady state", delete "steady state".

At claim 37, column 22, lines 55, 57 and 63 before the second occurrence of "steady state", delete "steady state".

UNITED STATES PATENT AND TRADEMARK OFFICE
CERTIFICATE OF CORRECTION

PATENT NO.       : 7,218,949 B2
APPLICATION NO.  : 10/721392
DATED            : May 15, 2007
INVENTOR(S)      : Koo et al.

It is certified that error appears in the above-identified patent and that said Letters Patent is hereby corrected as shown below:

At claim 42, column 23, line 25, before the second occurrence of "steady state", delete "steady state".

Signed and Sealed this

Third Day of June, 2008

JON W. DUDAS
*Director of the United States Patent and Trademark Office*